F. D. MARSHALL.
GRAIN SHOCKER.
APPLICATION FILED APR. 8, 1918.

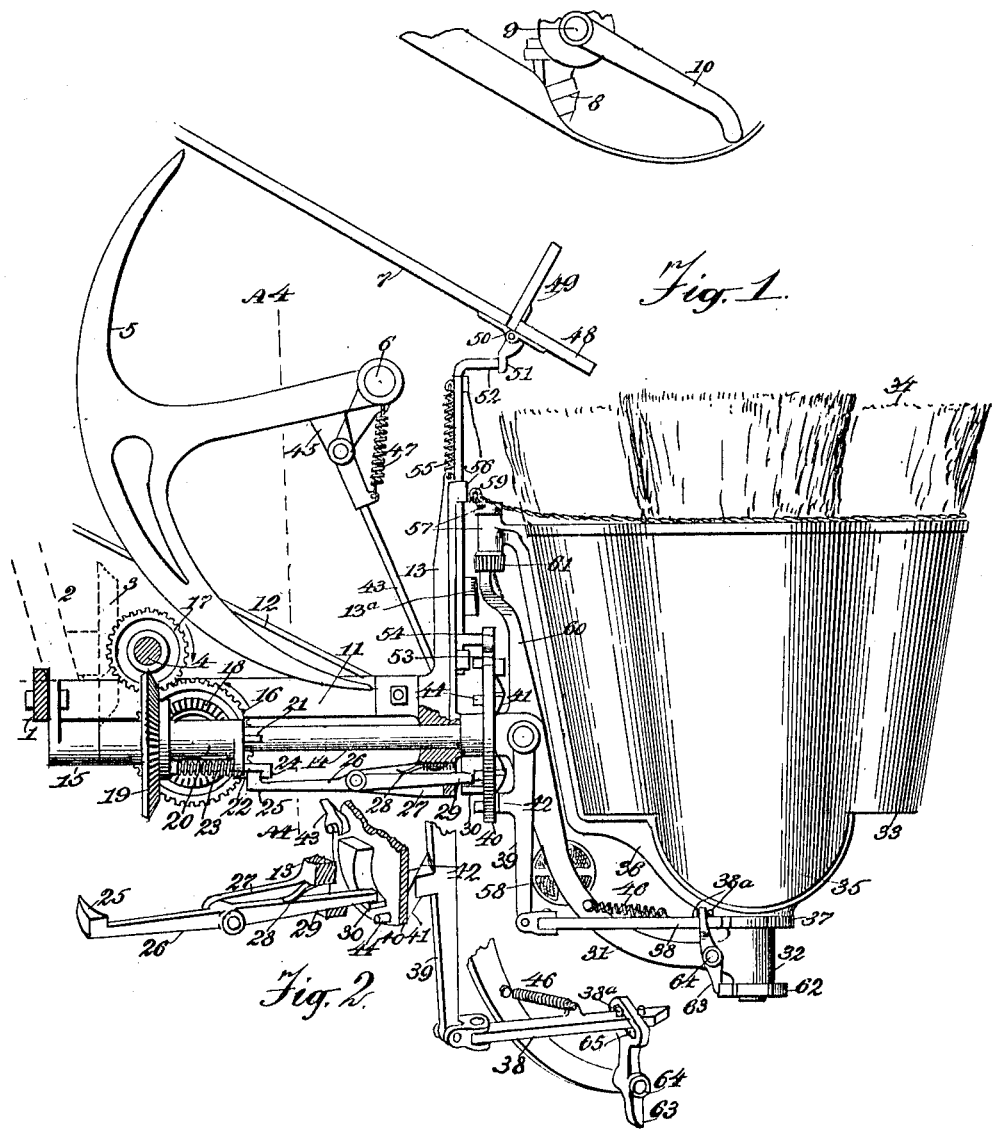

1,273,517.

Patented July 23, 1918.
2 SHEETS—SHEET 2.

Inventor
Frank D. Marshall
By J. M. St. John
Atty.

UNITED STATES PATENT OFFICE.

FRANK D. MARSHALL, OF CENTRAL CITY, IOWA.

GRAIN-SHOCKER.

1,273,517.

Specification of Letters Patent.

Patented July 23, 1918.

Application filed April 8, 1918. Serial No. 227,360.

*To all whom it may concern:*

Be it known that I, FRANK D. MARSHALL, a citizen of the United States, residing at Central City, in the county of Linn and State of Iowa, have invented certain new and useful Improvements in Grain-Shockers; and I do hereby declare the following to be a full, clear, and exact description of the invention, such as will enable others skilled in the art to which it appertains to make and use the same.

This invention relates to harvesting machines, the object of the invention being to provide such machines with mechanism adapted to catch the bundles as delivered from the binder, until enough for a shock has collected, and then deposit them on the ground, right end up, and in a neat and compact shock.

The invention also includes means for singling out a supplemental, cap-sheaf and dropping the same, when such cap-sheaf is desired.

Provision is also made for binding the shock with twine, when desired, to prevent any displacement of the sheaves in the act of dumping them on the ground.

The invention is fully disclosed in the description and claims following, reference being had to the accompanying drawings in which:—

Figure 3:
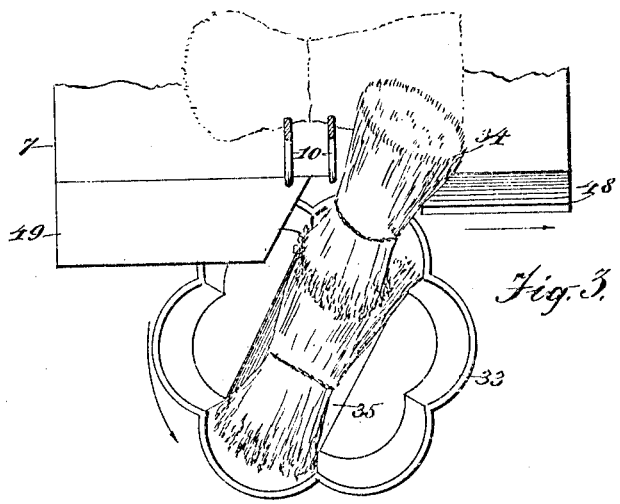
Figure 4:
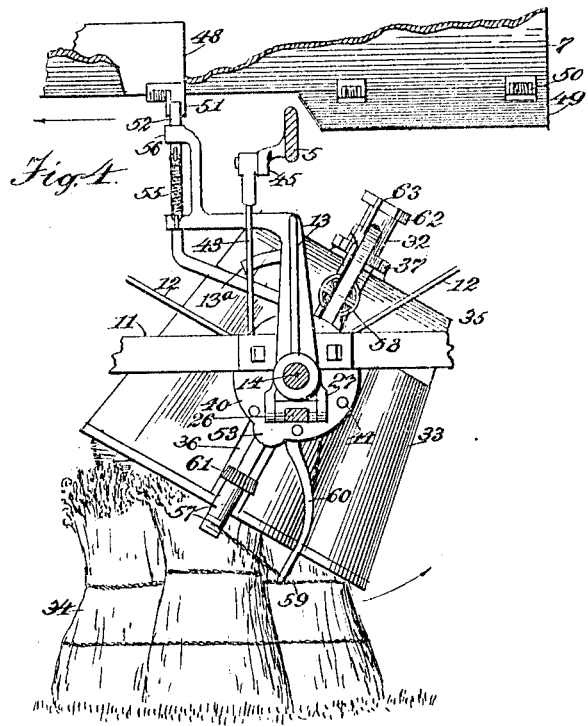

Figure 1 is a rear view of a device embodying my invention, a few of the parts being in section. Fig. 2 is a fragmentary and sectional view in perspective, showing details of the feed mechanism to be more fully hereinafter described. Fig. 3 is a plan view, illustrating the operation of the invention. Fig. 4 is a view of the device in the act of dumping a shock, as seen from the line A⁴—A⁴, looking toward the right.

In the drawing, the numeral 1 denotes a part of the main frame of a harvester of a familiar type, the adjacent dotted outline 2 indicating a part of the frame nearer the observer than the parts shown in full outline, and carrying gearing 3 which transmits motion to a shaft 4. This might be a special shaft for the purposes of this invention, but as shown it is one of the driving shafts connecting with the grain elevating apron, and has a continuous motion as the harvester is in operation. Above this is shown the regular needle 5 mounted on its rock-shaft 6 under the binding table 7. Over the binding table is mounted the knotter, 8, the main driving shaft 9 of which carries the ejector or "kicker" arms 10. Certain modifications in the construction of some of these parts will be described hereafter, but otherwise they may be of the common and well known type.

To the sill 1 of the main frame is secured a laterally extending frame 11, suitably supported by truss-rods 12. This frame gives support for a standard 13 at its outer extremity, serving as one of the bearings for a shaft 14 which carries the shocker to be described presently. The other bearing 15 may be bolted directly to the sill 1. The side frame also serves to support intermediate gearing whereby motion at reduced speed is transmitted from the shaft 4 to the shaft 14, intermittently. This gearing is shown as a spur-gear 16 meshing with a smaller gear 17 on the shaft 4, and a bevel gear 18 revolving concurrently with the spur-gear 16, and in mesh with a larger bevel-gear 19 running loosely on the shaft 14. Adjacent to this bevel gear is a clutch 20, of the single-revolution type affixed to the shaft 14, as by a key 21. This clutch engages the bevel-gear by a bolt 22 forced to engaging position by a spring 23. A shoulder 24 of the bolt engages a cam 25 forming part of a lever 26 pivoted in a fork 27 of the standard 13, and held to engaging position by a spring 28. When in this position the clutch is disengaged, and the bevel-gear may run freely on its shaft. The cam-lever extends by a tail-piece 29 into the path of a revolving cam 30, which in its movement disengages the cam 25, and thus engages the clutch, which is automatically disengaged in a single revolution of the shaft 14, as will be evident.

To the outer end of the shaft 14 is attached an arm 31, provided at its outer end with a bearing 32 for the pivot of the shock-carrier 33. This is in the nature of a sheet-metal basket, and preferably fluted at the sides to form seats for the sheaves 34, as deposited therein, six of these being here shown for a shock of convenient size. The basket as herein illustrated, may also be adapted to catch a single bundle crosswise, preferably with a pocket or trough 35 at the bottom to hold an extra sheaf, as shown in Fig. 3, this being the cap-sheaf when the shock is inverted, as will be explained presently. Connecting with the basket pivot is a casting 36, to which the basket is securely attached. Near the bearing is a ratchet 37, with teeth corresponding in number to the flutes of the basket. An intermittent turning motion is imparted to the basket by a pawl 38 connecting with a cam-lever 39 actuated in one direction by a cam-disk 40 provided with a number of inclined faces 41 to engage the inclined face 42 of the cam-lever. This disk is mounted to revolve on the shaft 14, and gets its step-by-step motion from the needle rock-shaft through a pawl 43 and suitable studs or the like projections 44. The connection of this pawl with the rock-shaft may be an offset arm 45 forming a part of the needle-arm. These pawls are retracted by means of springs 46 and 47, respectively. It will be noted that the forward feed of the basket coincides with the retreat of the needle, thus immediately following the discharge of the bound bundle.

The cam 30, which here forms a part of the cam-disk, is timed to coincide with the discharge of the last bundle, and trip the clutch 20 into action. As soon as this takes place the basket and its load is slowly inverted, in the direction and in the manner indicated in Fig. 4, the movement of the harvester being shown by the straight arrow, and that of the basket by the curved one. This latter movement should approximate that of the harvester forward, so that the basket, after dumping the shock, rolls over the tops of the standing sheaves, without dragging and displacing them.

As bound the bundle is practically parallel with the line of advance of the harvester. From this position it must be shifted to a nearly vertical position, so as to stand head down in the basket. Simple mechanism for this purpose is herein shown, and comprises in part a modification of the binding table as at present constructed. At the lower edge of the binding table are two flaps, 48 and 49, which are actuated by spring hinges 50 to assume the normal position at right angles to the table. To adapt such flaps to this invention, they are made somewhat wider than heretofore, and the forward one has its inner end spaced farther from the middle of the table edge, so as to give space for a bundle between it and the forward ejector, as shown in Fig. 3. When bundles are deposited at the sides of the basket this flap is locked in the upstanding position, and thus serves as a fulcrum against which the bundle is turned from the dotted line position to that shown by the descending bundle. The other flap, which may swing up and down at will, is preferably inclined at the inner end, and is so spaced as to give room for the descent of the bundle, whose head, in falling, pitches toward the near side of the basket. If no cap-sheaf were dropped in the basket the forward flap might be fixed in the upstanding position, but in dropping the cap sheaf this flap moves to the same position as the rear flap, and the two thus serve as an inclined shelf to carry the bundle, still parallel with the harvester, to the middle of the basket, and drop it into its proper trough. A simple device for shifting and locking the flap comprises a short arm 51 attached to the flap; a stop-bar 52 adapted to slide up to release the flap, and down to lock it in position; a cam 53 coöperating with a roller 54 to raise the bar, and a spring 55 to retract the same. The cam may be a part of the cam-disk already described, and so timed as to release the flap for the depositing of the cap-sheaf, and permit its return to the upstanding position for all the others. The stop-bar is shown mounted in guides 56 forming parts of an extension of the standard 13.

By changing the starting time of revolution of the basket in dumping, the act may be prolonged until an extra bundle is bound and discharged on the closed side or bottom of the basket, whence it rolls to the ground near the standing shock, and thus serves as a cap-sheaf. The action of the flaps in this case is practically the same as already described, but with suitable change in the timing of their action.

Provision is made for binding the whole shock with twine, to prevent any possible scattering of the bundles as dumped. Suitably mounted on the casting 36 is a knotter 57, the particular construction of which forms no necessary part of this invention, its only practical difference from knotters in general use being that it, instead of the needle, carries the twine, encircling thus the shock as the basket revolves. A cage 58 to hold the ball of twine is attached to the goose-neck 31, and the twine is led through an eye 59 in an arm 60 projecting upwardly and laterally from said goose-neck, so as to be outside the path of the knotter as the basket turns on its pivot. When the last bundle of the shock has been dropped into the basket, and the basket begins to turn to dump, the pinion 61 of the knotter engages a segment of gear 13$^a$ connecting with the standard 13, and the knot is tied, the knotter at the same time grasping the end of the twine leading to the ball, in a manner that will be readily understood by those familiar with knotter construction. The shock as finally deposited on the ground thus stands in a compact mass, as shown in Fig. 4.

When conditions are such as not to require any binding of the whole shock, this feature may be dispensed with.

It will be noted that the basket is suitably positioned to receive seven bundles, with but six feed impulses. This is due to the fact that at the sixth feed impulse the basket is carried to proper position to receive the cap-sheaf, and at the succeeding impulse, the first of a new series, the basket is in proper position to receive the first butt-raised sheaf, as clearly shown in Fig. 3. When a cap-sheaf is not used, the sequence of such feed impulses is not important.

When a knotter is used to bind the shock as a whole, the basket should be prevented from turning on its axis, so that the knotter may be properly actuated. This is effected by means of a simple lock, shown in Figs. 1 and 2. To the basket pivot is attached a notched disk 62, which is engaged by a lock-lever 63 pivoted at 64. The pawl 38 is shown passing through a slot 65 in the lock-lever, which thus serves as a support for it, and has lugs or studs 38ª to engage said lock-lever. The pawl has a little surplus motion, as shown in Fig. 1, and during this interval the lock-lever is released, before the forward feed of the basket begins. The locking action of the lock-lever of course coincides with the position of the basket at the end of the feed impulse.

It will be understood that the invention contemplates the collecting of a shock either with or without an extra sheaf for a cap-sheaf, and in case such extra sheaf is collected with the rest of the shock it may be discharged on top, or alongside the others. It also contemplates the dropping of the cap-sheaf in any suitable manner on the bottom of the receptacle, flatwise, but not necessarily in a trough, since the end sought would be attained without any further depression of the cap-sheaf than would be secured by spreading its ends, as by the weight of the standing bundles as dropped upon it.

Having thus described my invention, I claim:

1. Combined with a harvesting machine and its self-binding mechanism, a receptacle to receive the bundles with their butts upstanding, means to shift the receptacle to position to receive each successive bundle, and means adapted to invert the receptacle to deposit the grain shock on the ground.

2. Combined with a self-binder, a receptacle to receive the bound bundles heads down therein, means for intermittently rotating said receptacle, and means to invert the same to dump the collected shock.

3. Combined with a self-binder, a receptacle to receive the bound bundles with heads down, the receptacle having separate seats for the respective bundles, means for intermittently rotating said receptacle, and means to invert the same to dump the collected shock.

4. Combined with a self-binder, a receptacle to receive the bundles on end, heads down, means adapted to shift said receptacle to receive said bundles successively, and mechanism adapted to rotate the receptacle in the same direction as the self-binder drive wheels, and at a speed approximating the forward advance of the self-binder.

5. Combined with a self-binder and its knotting mechanism, a receptacle to receive the bundles on end, mechanism coöperating with the knotter mechanism to advance the receptacle for the reception of successive bundles, and means for inverting the receptacle to dump the collected shock.

6. A shocker for self-binders, comprising a basket-like receptacle to receive the bundles successively on end along its sides, means to shift the receptacle after receiving each bundle, and means coöperating therewith to invert said receptacle after receiving its last bundle.

7. A shocker for self-binders, comprising a basket-like receptacle with a central, vertical axis, a carrier therefor having an axis transverse thereto, means to intermittently turn the receptacle on its axis for the successive reception of bundles, and means connected with said transverse axis to give it one revolution to dump the collected shock.

8. A shocker for self-binders, comprising a receptacle to receive the bundles on end, heads down, means for positioning the same, to receive bundles successively, and an obstruction interposed between the butt of the bound bundle and said receptacle, whereby the bundle as ejected is turned endwise, with its head toward the center of said receptacle.

9. A shocker for self-binders, comprising a basket-like receptacle adjacent to and below the binding table, and of suitable depth to take the bundles on end, a flap forward of the bundle ejector, and spaced the diameter of a bundle away therefrom, and means for holding said flap erect when a bundle is ejected, whereby it is turned endwise to enter said receptacle.

10. A shocker for self-binders, comprising a basket-like receptacle to hold a shock of bundles on end, and having a trough therein to hold a bundle on its side, and means to shift the receptacle intermittently to receive said lying and standing bundles, and finally to invert them on the ground.

11. A shocker for self-binders, comprising a basket-like receptacle, having a bottom trough for a single bundle, means to support the same adjacent to and lower than the binding table, and to shift the receptacle successively for the reception of bundles, and finally to invert the collected shock, a pair of flaps hinged to the binding table, and means for locking the forward flap in upstanding position, whereby the released flaps may carry the cap-sheaf horizontally and drop it in said trough, and the locked flap may serve to turn the other bundles on their centers, and cause them to drop heads down along the sides of the receptacle.

12. A shocker for self-binders, comprising a basket-like receptacle and supporting and actuating mechanism to turn the receptacle horizontally to receive successive bundles on end, and to invert the collected shock, a pair of flaps hinged to the binding table, and serving when released to prolong the incline thereof, and means for locking the forward flap in upstanding position to deflect certain bundles to up-ended position, substantially as and for the purpose set forth.

13. In a shocker for self-binders, a receptacle to receive bundles on end as dropped from the binding table, a vertical axis therefor, a support therefor and a connecting shaft, a clutch carried thereby, gearing to revolve said shaft a single revolution, intermittently, and in coöperation with said clutch, and mechanism adapted on the discharge of a predetermined bundle to trip said clutch, whereby a collected shock is inverted and dumped on the ground in upstanding position.

14. Combined with a shocker for self-binders, comprising a receptacle to receive the bundles on end, means for turning the same intermittently to receive successive bundles, and means for inverting the collected shock, a knotter carried by said receptacle, and mechanism coöperating therewith to encircle the shock with a tied twine before its inversion.

15. Combined with a shocker for self-binders, comprising a receptacle to receive the bundles on end, means for turning the same intermittently to receive successive bundles, means for locking it in bundle receiving position, and finally inverting the shock, a knotter carried by said receptacle, and means to actuate said knotter as the receptacle is inverted.

In testimony whereof I affix my signature in presence of two witnesses.

FRANK D. MARSHALL.

Witnesses:
A. T. COOPER,
J. M. ST. JOHN.

Copies of this patent may be obtained for five cents each, by addressing the "Commissioner of Patents, Washington, D. C."